(12) United States Patent
Davis

(10) Patent No.: US 8,249,597 B2
(45) Date of Patent: Aug. 21, 2012

(54) METHOD OF PACKET SWITCHED HANDOVER

(75) Inventor: Simon Paul Davis, Hampshire (GB)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 0 days.

(21) Appl. No.: 12/929,213

(22) Filed: Jan. 7, 2011

(65) Prior Publication Data

US 2011/0103345 A1    May 5, 2011

Related U.S. Application Data

(62) Division of application No. 10/592,356, filed as application No. PCT/GB2005/000697 on Feb. 24, 2005, now Pat. No. 7,899,457.

(30) Foreign Application Priority Data

Mar. 11, 2004 (GB) .................................. 0405389.8
Jul. 1, 2004 (GB) .................................. 0414717.9

(51) Int. Cl.
*H04W 36/00* (2009.01)

(52) U.S. Cl. ...................................... 455/436; 370/331

(58) Field of Classification Search .......... 370/328–338; 455/436–444
See application file for complete search history.

(56) References Cited

U.S. PATENT DOCUMENTS

| 6,434,133 | B1 * | 8/2002 | Hamalainen | 370/338 |
|---|---|---|---|---|
| 6,968,190 | B1 * | 11/2005 | Suumaki et al. | 455/436 |
| 2002/0131386 | A1 | 9/2002 | Gwon | |
| 2003/0053431 | A1 | 3/2003 | Madour | |
| 2003/0142648 | A1 * | 7/2003 | Semper | 370/331 |
| 2006/0256749 | A1 * | 11/2006 | Rexhepi et al. | 370/329 |

FOREIGN PATENT DOCUMENTS

| GB | 2 374 494 | 10/2002 |
|---|---|---|
| WO | 00/79808 | 12/2000 |
| WO | 01/30107 | 4/2001 |
| WO | 01/35586 | 5/2001 |
| WO | 01/39525 | 5/2001 |

OTHER PUBLICATIONS

Hemish Parikh et al., "Seamless Handoff of Mobile Terminal from WLAN to cdma2000 Network," World Wireless Congress, May 30, 2003, pp. 1-6.
$3^{rd}$ Generation Partnership Project; Technical Specification Group GERAN; Packet-switched handover for GERAN A/Gb mode; Stage 2 (Release 6); 3GPP TS 43.129 V6.2.0 (Apr. 2005).

* cited by examiner

*Primary Examiner* — Kamran Afshar
*Assistant Examiner* — Kashif Siddiqui
(74) *Attorney, Agent, or Firm* — Staas & Halsey LLP

(57) ABSTRACT

A method of packet switched handover in a mobile communication system comprising a terminal, a source node and a destination node comprises negotiating protocol parameters for the destination node on behalf of a new network entity, by communicating with an old network entity whilst the terminal is still connected to the source node; and completing the packet switched handover, such that service interruption on handover is reduced.

13 Claims, 3 Drawing Sheets

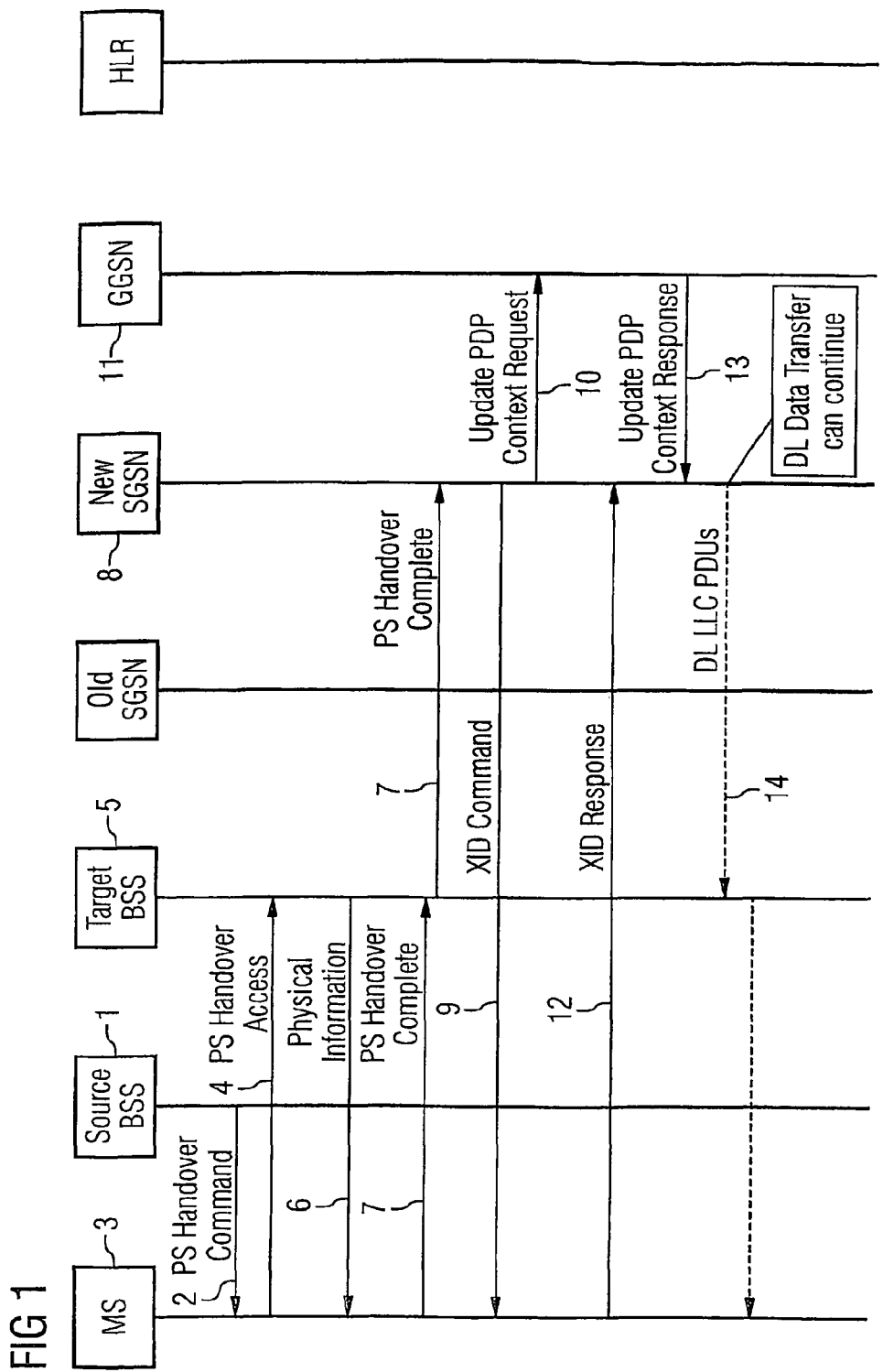

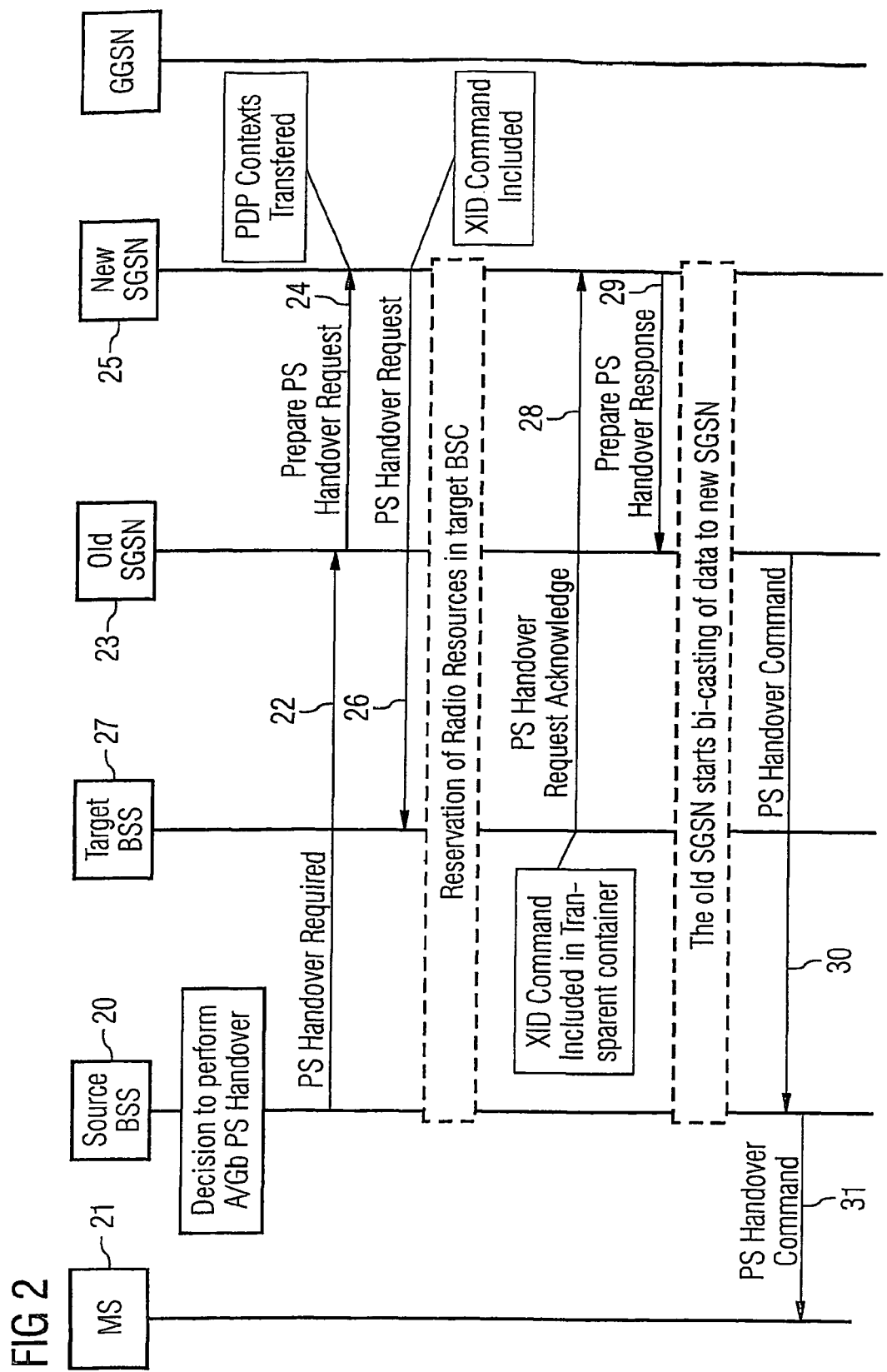

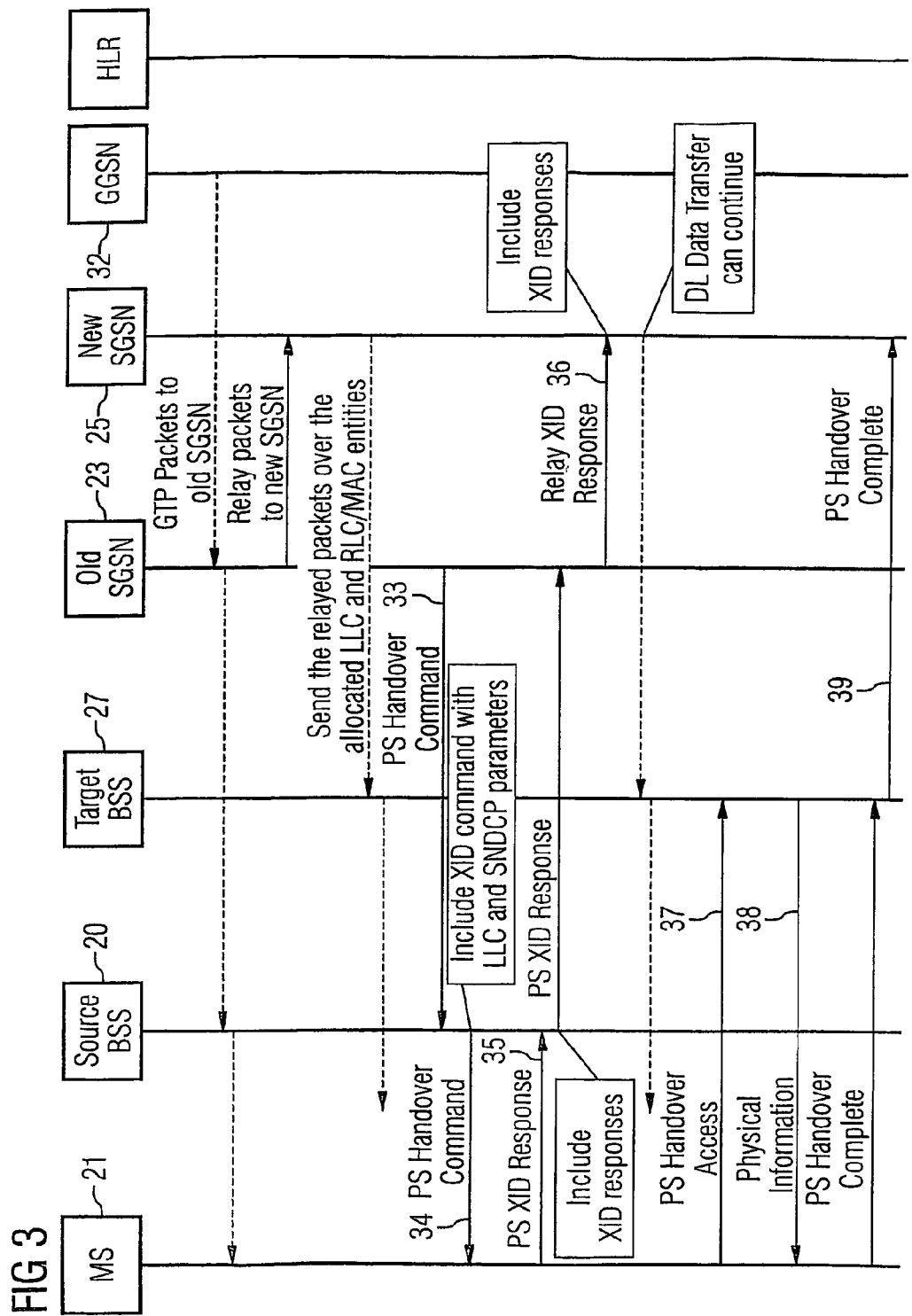

METHOD OF PACKET SWITCHED HANDOVER

CROSS REFERENCE TO RELATED APPLICATIONS

This application is a Divisional of U.S. application Ser. No. 10/592,356, filed on Jul. 11, 2007, now U.S. Pat. No. 7,899,457 which is based on and hereby claims priority to PCT Application No. PCT/GB2005/000697 filed Feb. 24, 2005, Great Britain Application No. 0405389.8 filed on Mar. 11, 2004 and Great Britain Application No. 0414717.9 filed on Jul. 1, 2004, the contents of which are hereby incorporated by reference.

BACKGROUND OF THE INVENTION

This invention relates to a method of packet switched handover in a mobile communication system, in particular for 2nd and 3rd generation mobile phone systems, using general packet radio service (GPRS).

Packet Switched (PS) handover is a relatively new topic in Global System for Mobile communications (GSM)/Enhanced Data rates for GSM Evolution (EDGE) Radio Access Network (GERAN) requiring new mechanisms in the RAN and Core Network. PS handover requires low PS service interruption times, preferably less than 200 ms. In the case of inter-SGSN handover the new SGSN (serving general packet radio service (GPRS) support node) may not be able, or may not want, to support the same set of parameters for the data protocols. In the case of GERAN, these are the Sub-network Dependent Convergence Protocol (SNDCP) and logical link control (LLC) protocols. In this case, a negotiation procedure takes place between the mobile and the SGSN after it establishes itself in the new cell after handover. During this procedure PS data cannot be received by the mobile thus increasing the PS service interruption time.

If new LLC/SNDCP parameters need to be negotiated for the mobile in the new cell, the target SGSN must initiate the procedure by sending an exchange identification (XID) command to the mobile. This can only be carried out when the SGSN knows that the mobile has successfully made access in the target cell by receiving the PS handover complete message as shown in FIG. 1. At this point the target SGSN can send the XID command to the mobile which in turn sends an XID response back to the target SGSN. Only when the XID response is received can the target SGSN start to relay downlink protocol data units (PDUs) to the mobile. This procedure causes a further two round trip times (mobile to SGSN and back) to be added to the service interruption time, which is undesirable.

SUMMARY OF THE INVENTION

The inventor proposes a method of packet switched handover in a mobile communication system comprising a terminal, a source node and a destination node comprises negotiating protocol parameters for the destination node on behalf of a new network entity, by communicating with an old network entity whilst the terminal is still connected to the source node; and completing the packet switched handover, such that service interruption on handover is reduced.

According to the method most, if not all, of the negotiation procedure is conducted before the mobile moves to the new cell, thus considerably reducing the service interruption time.

Preferably, the negotiation of protocol parameters comprises including an exchange identification data command in a packet switched handover request.

Preferably, the exchange identification data command is packed in a target to source transparent container at a target base station, transferred to a source base station, unpacked and sent in a packet switched handover command to the terminal.

As a packet switched handover request is not always present, alternatively, the negotiation of protocol parameters comprises including an exchange identification data command in a packet switched handover command and continuing downlink data transfer before the packet switched handover is complete.

Preferably, a packet switched exchange identification response is sent from the terminal to a source base station and thence to the source node; and relayed to the destination node, such that downlink data transfer continues. Typically, the source node is an SGSN.

Preferably, a start time for the terminal to access a target cell in the packet switched handover command is delayed. This has the effect of further reducing the down time.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 shows an example of conventional packet switched handover in a mobile communication system;

FIG. 2 illustrates a first example of a method of packet switched handover in accordance with one embodiment of the present invention; and, FIG. 3 illustrates a second example of a method of packet switched handover in accordance with one embodiment of the present invention.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

FIG. 1 illustrates the conventional steps for inter-SGSN packet switched (PS) handover XID procedure after access to a target cell. A source base station 1 sends a PS handover command 2 to a mobile station 3. The mobile station (MS) replies with a PS handover access message 4 to a target base station system (BSS) 5 which sends physical information 6 back to the MS. The MS then sends a PS handover complete message 7 to the target BSS, which sends this message on to a new serving GPRS support node (SGSN) 8. Only once the PS handover is complete does a procedure for negotiating new parameters begin. This is done by the new SGSN 8 sending an exchange identification (XID) command 9 to the MS and an update packet data protocol (PDP) context request 10 to a gateway GPRS support node (GGSN) 11. The MS sends back an XID response 12 and the GGSN sends back an update PDP context response 13. The new SGSN starts to relay downlink logical link protocol data units (PDU's) 14 to the MS 3 after having received the XID response, so that downlink data transfer can continue.

The method addresses the problem of the delays caused by having to wait until after the handover is complete to start the protocols set up, by carrying out the negotiation steps, at least partially, while the terminal is still connected to the source cell. An example of a network entity is the SGSN for inter-SGSN handover in 2G systems, but more generally for both 2G and 3G systems, the network entity is any core network end-point that requires different protocol parameters. One option for achieving the negotiation steps for the 2G example is for a target SGSN to pass XID information to a target BSS packed in a target BSS to source BSS transparent container. An XID command is included in a PS handover request from the target SGSN to the target BSS, then packed into the target to source transparent container which is passed via messages to the source BSS where it is unpacked and sent in the PS handover command.

This is explained in more detail with reference to FIG. 2. A decision is made by a source BSS 20 to perform A/Gb mode PS handover (where an MS 21 is connected to a core network via GERAN and the Gb interface). A PS handover required message 22 is sent to an old SGSN 23 which passes on a prepare PS handover request message 24 to a new SGSN 25 which transfers the PDP contexts. The new SGSN sends a PS handover request 26 to a target BSS 27 including an XID command, which has the effect of reserving radio resources in the target base station controller (BSC). The target BSS 27 returns a PS handover request acknowledge 28 to the new SGSN 25 with the XID command packed in a target to source transparent container which is passed via a new SGSN to old SGSN prepare handover response message 29 and an old SGSN to a source BSS PS handover command 30 to the source BSS 20. Here the XID command is unpacked and sent to the MS in the PS handover command 31. On receipt of the prepare PS handover response message 29, the old SGSN 23 may start bi-casting of data to the new SGSN.

A further optimisation is possible by providing a mechanism for the XID response message to be sent to the target SGSN whilst the mobile station (MS) is still in the source cell. The MS responds to the XID command sent in the PS handover command by sending a new message on the radio interface called "PS XID Response". This message is passed on to the source SGSN in a new BSS GPRS protocol (BSSGP) message also called "PS XID Response" and then relayed back to target SGSN via a new GPRS tunnelling protocol (GTP) message called "Relay XID Response". Once the target SGSN has a satisfactory XID response, downlink LLC PDUs that may have been relayed from the source SGSN can be sent towards the target cell. By delaying the start time for the MS to access the target cell in the PS handover command, the extra PS service interruption time caused by the XID negotiation procedure can be reduced to less than one round trip time (MS to SGSN and back) and possibly reduced to zero depending on how long the MS is able to remain in the source cell.

An example of this optimisation is described with respect to FIG. 3. In this case an XID response message is sent to the target SGSN 25 whilst the MS 21 is still in the source cell. GPRS tunnelling protocol (GTP) packets are sent from a GGSN 32 to the old SGSN 23 and from there the packets are relayed to the new SGSN 25. The relayed packets are sent over allocated logical link control (LLC) and radio link control/medium access control (RLC/MAC) entities. When a handover is required, the old SGSN 23 sends a PS handover command 33 to the source BSS 20 and the source BSS sends on a PS handover command 34 to the MS 21. The PS handover command 34 includes an XID command with LLC and SNDCP parameters. The MS sends back a PS XID response 35 to the source BSS, which sends the response on to the old SGSN, including XID responses. The old SGSN 23 forwards a relay XID response 36 to the new SGSN 25, so that downlink data transfer can continue. The remainder of the PS handover steps continue in the usual way, i.e. the MS 21 sends a PS handover access message 37 to the target BSS 27, the target BSS sends back physical information 38 to the MS and the MS indicates to the target BSS that the PS handover is complete. The PS handover complete message 39 is send on to the new SGSN 25 to finish the procedure.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for a packet switched handover in a mobile communication system comprising a terminal, a source node and an old network entity; and a destination node and a new network entity, the method comprising:
    negotiating protocol parameters for the destination node in order to handover a new network entity, by communicating the protocol parameters from the new network entity to the old network entity and the source node, wherein the protocol parameters are determined by the new network entity;
    communicating the protocol parameters from the source node over the radio interface to the terminal whilst the terminal is still connected to the source node; and
    completing the packet switched handover after the terminal receives the protocol parameters, such that service interruption on handover is reduced.

2. A method according to claim 1, wherein negotiating protocol parameters comprises including an exchange identification data command in a packet switched handover request.

3. A method according to claim 2, wherein the destination node is a target base station and the source node is a source base station; and
    the exchange identification data command is packed in a target to source transparent container at the target base station, transferred to the source base station in the container, unpacked and sent in a packet switched handover command to the terminal.

4. A method according to claim 1, wherein negotiating protocol parameters comprises including an exchange identification data command in a packet switched handover command and continuing downlink data transfer before the packet switched handover is complete.

5. A method according to claim 4, wherein a packet switched exchange identification response is sent from the terminal to a source base station and thence to the source node; and relayed to the destination node, such that downlink data transfer continues.

6. A method according to claim 3, wherein a start time for the terminal to access a target cell containing the destination node is delayed via the packet switched handover command.

7. A method according to claim 5, wherein a start time for the terminal to access a
    target cell containing the destination node is delayed via the packet switched handover command.

8. A method for a packet switched handover in a mobile communication system comprising a terminal, a source node and an old network entity; and a destination node and a new network entity, the method comprising:

negotiating protocol parameters for the destination node in order to handover a new network entity, by communicating the protocol parameters from the new network entity to the old network entity and the source node;

communicating the protocol parameters from the source node over the radio interface to the terminal whilst the terminal is still connected to the source node; and completing the packet switched handover after the terminal receives the protocol parameters, such that service interruption on handover is reduced, wherein negotiating protocol parameters comprises including an exchange identification data command in a packet switched handover request.

9. A method according to claim 8, wherein the destination node is a target base station and the source node is a source base station; and the exchange identification data command is packed in a target to source transparent container at the target base station, transferred to the source base station in the container, unpacked and sent in a packet switched handover command to the terminal.

10. A method according to claim 9, wherein a start time for the terminal to access a target cell containing the destination node is delayed via the packet switched handover command.

11. A method for a packet switched handover in a mobile communication system comprising a terminal, a source node and an old network entity; and a destination node and a new network entity, the method comprising:

negotiating protocol parameters for the destination node in order to handover a new network entity, by communicating the protocol parameters from the new network entity to the old network entity and the source node;

communicating the protocol parameters from the source node over the radio interface to the terminal whilst the terminal is still connected to the source node; and completing the packet switched handover after the terminal receives the protocol parameters, such that service interruption on handover is reduced, wherein negotiating protocol parameters comprises including an exchange identification data command in a packet switched handover command and continuing downlink data transfer before the packet switched handover is complete.

12. A method according to claim 11, wherein a packet switched exchange identification response is sent from the terminal to a source base station and thence to the source node; and relayed to the destination node, such that downlink data transfer continues.

13. A method according to claim 12, wherein a start time for the terminal to access a target cell containing the destination node is delayed via the packet switched handover command.

* * * * *